United States Patent [19]

Speakman et al.

[11] 4,333,851

[45] Jun. 8, 1982

[54] OLEFIN POLYMERIZATION CATALYST, PROCESS AND POLYOLEFIN PRODUCT

[75] Inventors: John G. Speakman, Bo'ness, Scotland; Nicholas P. Wilkinson, Kettering, England

[73] Assignees: BP Chemicals Limited, London; The University of Nottingham, Nottingham, both of England

[21] Appl. No.: 166,197

[22] Filed: Jul. 7, 1980

[30] Foreign Application Priority Data

Jul. 17, 1979 [GB] United Kingdom ................. 7924895

[51] Int. Cl.$^3$ ............................................... C08F 4/64
[52] U.S. Cl. ............................ 252/429 B; 252/429 C; 526/116
[58] Field of Search ....................... 252/429 B, 429 C

[56] References Cited

U.S. PATENT DOCUMENTS 3,745,154  7/1973  Kashiwa et al. ............ 252/429 C X
4,173,547 11/1979  Graff ........................... 252/429 C X
4,232,140 11/1980  Ort ............................... 252/429 B X

FOREIGN PATENT DOCUMENTS 1351488  5/1974  United Kingdom .

*Primary Examiner*—Patrick Garvin
*Attorney, Agent, or Firm*—Brooks, Haidt, Haffner & Delahunty

[57] ABSTRACT

A supported Ziegler catalyst prepared by reacting, under substantially anhydrous conditions, a refractory oxide support material having acidic surface hydroxyl groups, e.g. silica, and an organo metallic compound, e.g. a trialkyl aluminium compound, separating any unreacted organo metallic compound and impregnating the solid product with a halogen-containing titanium compound and a halogen-containing vanadium compound. The catalyst, preferably together with a conventional Ziegler catalyst activator, e.g. an aliminium alkyl, is employed to polymerize 1-olefins, for example ethylene.

11 Claims, No Drawings

OLEFIN POLYMERIZATION CATALYST, PROCESS AND POLYOLEFIN PRODUCT

The present invention relates to a supported Ziegler catalyst for polymerising 1-olefins and to a process for polymerizing 1-olefins employing the catalyst.

It has long been known that 1-olefins such as ethylene can be polymerised by contacting them under polymerisation conditions with a catalyst obtained by activating a transition metal-containing component, e.g. a titanium compound such as titanium tetrachloride, with an activator or co-catalyst, e.g. an organo-metallic compound such as triethylaluminium. Catalysts comprising the transition metal-containing component and the co-catalyst or activator are generally referred to in the art as "Ziegler catalysts" and this terminology will be used throughout this specification.

The Ziegler catalyst component comprising the transition metal can be used either in an unsupported condition, or supported on support materials such as silicon carbide, calcium phosphate, silica, magnesium carbonate or sodium carbonate.

U.K. Pat. No. 1,256,851 discloses a catalyst for the low-pressure polymerisation and copolymerisation of olefins, comprising:
(a) an organometallic compound, or an organosilicon compound having at least one Si—H bond, and
(b) a solid product obtained by reacting a substantially anhydrous support consisting of a solid bivalent-metal compound with an organometallic compound, or an organosilicon compound having at least one Si—H bond, this being either identical to or different from "(a)", separating the solid product resulting from the reaction, reacting this product with a halogenated derivative of a transition metal, and separating the final solid reaction product; the molar ratio of "(a)" to the transition metal chemically bonded to the support being at least 2.

U.K. Pat. No. 1,306,044 relates interalia to a process for polymerising alpha-olefins using a catalyst comprising an organometallic compound and the solid product obtained by reacting silica or alumina with an excess of a compound of the formula $MR_nX_{m-n}$ wherein M is aluminium or magnesium, R is a hydrocarbon radical, X is hydrogen or halogen, m is the valency of M and n is a whole number not greater than m, separating and washing the solid product and reacting it with an excess of a halogen-containing transition metal compound and separating the solid reaction product.

It is an object of the present invention to provide an improved supported Ziegler catalyst. It is a further object to provide a supported Ziegler catalyst having improved activity.

Accordingly the present invention provides a supported Ziegler catalyst prepared by carrying out the following steps under substantially anhydrous conditions (A) reacting rogether a refractory oxide support material having acidic surface hydroxyl groups and an organometallic compound wherein the metal is aluminium, boron, lithium, zinc or magnesium, (B) separating unreacted organometallic compound, if any, from the solid product obtained from step (A), (C) impregnating the solid product with a halogen-containing titanium compound and a halogen-containing vanadium compound and (D) separating unadsorbed titanium and vanadium compounds, if any, from the solid catalyst obtained from step (C). For the purpose of this specification, boron is considered to be a metal.

In step A the refractory oxide support material is suitable any particulate oxide or mixed oxide, e.g. silica, silica-aluminia, alumina, zirconia, thoria or titania, having acidic surface hydroxyl groups capable of chemically reacting with the organometallic compound. Preferred support materials are those suitable for use in well-known Phillips process for the polymerisation of ethylene (see for example U.K. Pat. Nos. 790,195; 804,641; 853,414; French Pat. Nos. 2,015,128; 2,015,130 and Belgian Pat. No. 741,437). Microspheroidal silicas and silica-aluminas having a mean particle diameter in the range 30 to 300 μm, a surface area of 50 to 1000 square meters per gram and a pore volume of 0.5 to 3.5 cc/gram are particularly preferred. The support material should be substantially dry before reacting with the organometallic compound and is preferably dried by heating for several hours in a vacuum oven at a temperature in the range 70° to 150° C. Heating overnight in vacuo at about 110° normally gives adequate drying.

The organometallic compound used to prepare the catalyst of the present invention must contain at least one metal-carbon bond. Preferred organometallic compounds are trihydrocarbyl aluminium, trihydrocarbyl boron, dihydrocarbyl zinc or magnesium and hydrocarbyl lithium compounds. Examples of organometallic compounds which can be employed are triethyl aluminium, isoprenyl aluminium, diethyl aluminium chloride, diethyl aluminium ethoxide, triethyl boron, dibutyl magnesium, ethyl magnesium bromide, diethyl zinc and butyl lithium. Aluminium trialkyls are particularly preferred, especially those containing 1 to 10 carbon atoms in each alkyl group.

The quantity of organometallic compound employed in step A is suitably in the range 0.1 to 10 moles, preferably 0.5 to 1.5 moles per mole of surface hydroxyl groups on the support material.

The reaction between the organometallic compound and the support material can be conducted in any desired manner provided that the reaction mixture is substantially free from water and other materials containing reactive groups which react with the organometallic compound. The reaction can be conducted in the presence of an inert diluent or solvent for the organometallic compound if desired. Examples of suitable solvents are liquid hydrocarbons, for example, cyclohexane or normal-hexane. The reaction is preferably carried out in a solvent at a temperature between ambient and the bp of the solvent, for example at a temperature in the range 10°-80° C., although temperatures above or below this range can be employed if desired. The reaction between the organometallic compound and the support material generally occurs rapidly at ambient temperature and a reaction time of one hour or less is normally adequate although longer times can be employed if desired.

After the reaction between the organometallic compound and the support material is substantially complete, the unreacted (i.e. unadsorbed) organometallic compound, if any, is separated in step B from the solid product from step A. The separation is preferably achieved by washing the solid product with an anhydrous inert solvent, for example, cyclohexane, normal-hexane or petroleum ether. The solid product must be protected from contact with other substances with which it may deleteriously react, for example, air.

In step C the solid product is impregnated with one or more halogen-containing titanium compounds and one or more halogen-containing vanadium compounds wherein the titanium is preferably tetra-valent and the vanadium is preferably tetra- or penta-valent. Preferably these compounds are selected from compounds having the general formulae $LY_p$, $LOY_{(p-2)}$ and $L(OR')_sY_{p-s}$ wherein L is the titanium or vanadium; Y is halogen, preferably chlorine; O is oxygen; R' is a hydrocarbyl group, for example, alkyl, aryl or cycloalkyl, preferably containing 1–10 carbon atoms; p is the valency of L; and s is an integer from 1 ot p-1. Examples of suitable titanium compounds are titanium tetrachloride, trichlorotitanium ethylate, dichlorotitanium diisopropylate and titanium oxychloride. Examples of suitable vanadium compounds are vanadyl chloride and vanadium tetrachloride. Titanium tetrachloride and vanadyl chloride are preferred.

The combined total quantity of titanium and vanadium compounds employed in preparing the catalyst of the present invention is suitably 0.05 to 10 moles, preferably 0.1 to 1.5 moles, most preferably 0.4 to 1.0 moles per mole of organometallic compound residue bound to the support surface. The quantity of organometallic compound residue bound to the support surface can conveniently be determined by conventional analytical techniques, for example, elementary analysis.

Suitably the atomic ratio of Ti:V used in the catalyst preparation 100:1 to 1:100, preferably 10:1 to 1:10, most preferably 5:1 to 1:2.

The impregnation step C can be carried out by impregnating the solid product from step B with the titanium compound and vanadium compound separately or together. It is preferred to impregnate using a mixture of the titanium and vanadium compounds. The impregnation can be carried out using the neat (undiluted) titanium and vanadium compounds or by dissolving either or both of them in an inert solvent, for example a liquid hydrocarbon solvent. The inert solvent, when used, must be free from functional groups capable of reacting with the solid material obtained from step B and the titanium and vanadium compounds. Cyclohexane is an example of a suitable inert solvent. The impregnation step is preferably carried out by contacting the solid material obtained from step B with the titanium and vanadium compounds at a temperature in the range 10° to 150° C. It is particularly preferred to carry out the impregnation by stirring the mixture of said solid material and titanium and vanadium compounds in an inert solvent at a temperature in the range 10° to 30° C. The contacting in the impregnation step C is preferably carried out for a time in the range 10 minutes to 24 hours.

In step D the catalyst obtained from step C is separated from any unabsorbed titanium or vanadium compound by conventional means, for example, washing with dry inert solvent, or, if volatile titanium and vanadium compounds having been employed, by purging with inert gas, eg nitrogen, helium or argon. Preferably the separation is carried out by washing the catalyst component several times with aliquots of dry hydrocarbon solvent. The catalyst may be stored as the dry material in a suitable non-reactive atmosphere, eg argon, nitrogen or other inert gas, or as a slurry in inert solvent.

The combined total quantity of titanium and vanadium contained in the product from step D of the catalyst preparation is suitably in the range 0.05 to 10 moles per mole of organometallic compound residue bound to the support material surface. The ratio of Ti:V in the product from step D is suitably 100:1 to 1:100, preferably 10:1 to 1:10.

The present invention further comprises a process for polymerising one or more 1-olefins comprising contacting the monomer under polymerisation conditions with the catalyst of the present invention preferably in the presence of a Ziegler catalyst activator. Ziegler catalyst activators and the methods in which they are used to activate Ziegler catalysts are well known. Ziegler catalyst activators are organometallic derivatives or hydrides of metals of Groups I, II, III, and IV of the Periodic Table. Particularly preferred are trialkyl aluminium compounds or alkylaluminium halides, for example triethylaluminium, tributylaluminium and diethylaluminium chloride. When a Ziegler catalyst activator is employed, preferably it is present in an amount such that the atomic ratio of metal atoms in the activator: total transition metal supported on the catalyst support is not greater than 5:1.

The polymerisation process of the present invention can be applied to the homopolymerisation of 1-olefins, eg ethylene or propylene, or to the copolymerisation of mixtures of 1-olefins, eg ethylene with propylene, 1-butene, 1-pentene, 1-hexene, 4-methylpentene-1, 1,3-butadiene or isoprene. The process is particularly suitable for the homopolymerisation of ethylene or the copolymerisation of ethylene with up to 40% weight (based on total monomer) of comonomers.

The polymerisation conditions can be in accordance with known techniques used in support Ziegler polymerisation. The polymerisation can be carried out in the gaseous phase or in the presence of a dispersion medium in which the monomer is soluble. As a liquid dispersion medium, use can be made of an inert hydrocarbon which is liquid under the polymerisation conditions, or of the monomer or monomers themselves maintained in the liquid state under their saturation pressure. The polymerisation can if desired be carried out in the presence of hydrogen gas or other chain transfer agent to vary the molecular weight of the produced polymer.

The polymerisation is preferably carried out under conditions such that the polymer is formed as solid particles suspended in a liquid diluent. Generally the diluent is selected from paraffins and cycloparaffins having from 3–30 carbon atoms per molecule. Suitable diluents include for example isopentane, isobutane, and cyclohexane. Isobutane is preferred.

Methods of recovering the product polyolefin are well known in the art.

The polymerisation catalyst of the present invention can be used to make high density ethylene polymers and copolymers at high productivity having properties which render them suitable for a variety of applications.

The invention is further illustrated by the following Examples.

In the Examples the melt index ($MI_{2.16}$) and high load melt index ($MI_{21.6}$) were determined according to ASTM method D 1238 conditions E and F respectively; the units are grams per 10 minutes. MIR is $MI_{21.6}/MI_{2.16}$.

PREPARATION OF CATALYST

EXAMPLES 1-3

Commercial silica (951 grade, W R Grace & Co) of surface area 575 $m^2g^{-1}$ was dried overnight under vacuum at 150° C. to remove surface moisture. The silica was then slurried in dry cyclohexane (200 ml) in a vessel purged with dry nitrogen and triethyl aluminium in a 10% by wt solution in n-hexane was added. The mixture was stirred at room temperature (25° C.) for 30 minutes, then the silica was washed with 3×200 ml portions of fresh dry cyclohexane to remove unadsorbed alkyl. The support slurry was stored under nitrogen.

Titanium tetrachloride ($TiCl_4$) and vanadyl chloride ($VOCl_3$) were mixed together and added to the cyclohexane slurry. The mixture was stirred at room temperature for 30 minutes, then the catalyst component was washed with 4×200 ml portions of fresh dry cyclohexane to remove unadsorbed transition metal compound. The catalyst slurry in cyclohexane was stored under nitrogen. The quantities of reagents employed in the catalyst preparation and the analysis of a sample of solid in the catalyst slurry are given in Tables 1 and 2.

EXAMPLE 4

The catalyst in this Example was prepared as in Examples 1-3 except that the triethyl aluminium employed in the treatment of the silica in the first step of the catalyst preparation was replaced by dibutyl magnesium (see Table 1). Analysis figures on a sample of the dried solid catalyst are given in Table 2.

EXAMPLE 5

The catalyst in this Example was prepared as in Examples 1-3 except that the silica was replaced by silica-alumina (see Table 1). Analysis of the solid catalyst is given in Table 2.

The catalysts obtained from Examples 1-5 were used to polymerise ethylene in the presence of conventional Ziegler catalyst activator to enhance the catalyst activity.

Polymerisation of Ethylene (EXAMPLES 1-5)

Bench scale polymerisation was carried out in a 2.3 liter stainless steel stirred autoclave. The reactor was purged with nitrogen, baked out for 2 hours at 110° C., then cooled to 90° C. The catalyst was added to the reactor by means of a syringe; the weight of solid catalyst added is given in the accompanying Table. A conventional Ziegler catalyst activator (triethyl aluminium) was mixed with dry isobutane (1 liter) and the mixture charged to the reactor. Hydrogen was added to the reactor (see Table 3). The reactor temperature was maintained at 90° C. and the ethylene was added to bring the total pressure in the reactor to 41.4 bar. Ethylene was added continuously through the run to maintain this pressure.

Polymerisation and polymer property data are shown in Table 3.

TABLE 1

| Example | Catalyst Preparation Weight (g) | | | | | | |
|---|---|---|---|---|---|---|---|
| | $SiO_2$ | $SiO_2/Al_2O_3$ | $AlEt_3$ | $MgBu_2$ | $TiCl_4$ | $VOCl_3$ | *Ti:V |
| 1 | 7 | — | 2.1 | — | 3.3 | 2.7 | 1.1 |
| 2 | 7 | — | 2.1 | — | 0.75 | 1.24 | 0.55 |
| 3 | 7 | — | 2.1 | — | 1.65 | 0.62 | 2.4 |
| 4 | 7 | — | — | 4.1 | 3.3 | 2.7 | 1.1 |
| 5 | — | 10 | 3.0 | — | 0.35 | 1.25 | 0.26 |

*Atomic ratio based on quantities of titanium and vanadium compound employed in catalyst preparation.

TABLE 2

| Example | Catalyst Analysis wt % | | | | | Atomic ratio Ti/V calculated on analysis |
|---|---|---|---|---|---|---|
| | Ti | V | Cl | Al | Mg | |
| 1 | 2.9 | 5.5 | 18.5 | NM | 0 | 0.56 |
| 2 | 1.9 | 3.2 | 11.6 | 4.3 | 0 | 0.63 |
| 3 | 3.7 | 1.7 | 13.7 | 4.3 | 0 | 2.3 |
| 4 | 3.5 | 5.8 | 22.9 | 0 | 4.9 | 0.64 |
| 5 | 0.94 | 2.4 | 6.8 | NM | 0 | 0.42 |

The above catalyst analysis figures were determined by sampling the catalyst slurry (before such slurry was added to the polymerisation medium) and carrying out analysis on the dried slurry samples.
NM — not measured.

TABLE 3

| EXAMPLE | Ti:V* Atomic Ratio | Wt. (g) | | Hydrogen Partial Pressure (bar) | Polymerisation Time (mins) | Yield of Polymer (g) | Catalyst Activity (kg/kg h) | Polymer Properties | | |
|---|---|---|---|---|---|---|---|---|---|---|
| | | Catalyst | $AlEt_3$ | | | | | $MI_{2.16}$ | $MI_{21.6}$ | MIR |
| 1 | 1.1 | 0.141 | 0.035 | 3.4 | 55 | 450 | 3480 | 0.21 | 7.7 | 37 |
| 2 | 0.55 | 0.093 | 0.028 | 6.9 | 63 | 201 | 2060 | 0.29 | 12.0 | 41 |
| 3 | 2.4 | 0.086 | 0.042 | 6.9 | 60 | 457 | 5310 | 0.26 | 10.0 | 38 |
| 4 | 1.1 | 0.098 | 0.049 | 6.9 | 60 | 190 | 1930 | 0.68 | 32.5 | 48 |
| 5 | 0.26 | 0.104 | 0.021 | 5.5 | 60 | 181 | 1740 | 0.24 | 12.9 | 54 |

*This is the Ti:V atomic ratio of the reagents used in preparing the catalyst.

Examples 1-3 illustrate a catalyst according to the present invention, using tri-ethyl aluminium as the organo-metallic compound in step A and silica as the refractory oxide support, wherein the Ti/V atomic ratio has been varied. It will be noted that the catalyst prepared using a Ti/V atomic ratio in the starting materials of 2.4 has even higher activity than those prepared using a lower Ti/V ratio.

Example 4 illustrate the use of magnesium dibutyl as the organometallic compound employed in step (A) of the catalyst preparation and Example 5 illustrates the use of silica-alumina as the refractory oxide support.

What we claim is:

1. A supported Ziegler catalyst prepared by carrying out the following steps under substantially anhydrous conditions (A) reacting together a refractory oxide support material having acidic surface hydroxyl groups and an organo metallic compound wherein the metal is aluminum, boron, lithium, zinc or magnesium, (B) separating unreacted organo metallic compound, if any, from the solid product obtained from step (A), (C) impregnating the solid product with a halogen-containing titanium compound and a halogen-containing vanadium compound in which the halogen is attached directly to the metal of said comounds and (D) separating unadsorbed titanium and vanadium compounds, if any, from the solid catalyst obtained from step (C).

2. A catalyst as claimed in claim 1 wherein the refractory oxide is selected from silica, silica-alumina, alumina, zirconia, thoria or titania.

3. A catalyst as claimed in claim 1 wherein the organo metallic compound is an aluminium trialkyl containing 1 to 10 carbon atoms in each alkyl group.

4. A catalyst as claimed in claim 1 wherein the quantity of organo metallic compound employed in step (A) is in the range 0.5 to 1.5 moles per mole of surface hydroxyl groups on the support material.

5. A catalyst as claimed in claim 1 wherein the titanium compound and the vanadium compound are selected from compounds having the general formulae:

$LY_p$, $LOY_{(p-2)}$ and $L(OR^1)_s Y_{p-s}$ wherein L is the titanium or vanadium; Y is halogen; O is oxygen; $R^1$ is a hydrocarbyl group containing 1–10 carbon atoms; p is the valency of L; and s is an integer from 1 to p−1.

6. A catalyst as claimed in claim 1 wherein the titanium compound is titanium tetrachloride.

7. A catalyst as claimed in claim 1 wherein the vanadium compound is vanadyl chloride.

8. A catalyst as claimed in claim 1 wherein the combined total quantity of titanium and vanadium compounds employed lies in the range 0.05 to 10 moles per mole of organo metallic compound residue bound to the support surface and the atomic ratio of Ti; V lies in the range 100:1 to 1:100.

9. A catalyst as claimed in claim 1 wherein the catalyst activity is enhanced by the presence of a Ziegler catalyst activator.

10. A catalyst as defined in claim 1 wherein the refractory oxide support material comprises a particulate oxide or mixed oxide.

11. A catalyst as defined in claim 10 wherein said oxide is one or more of silica, silica-alumina, thoria, zirconia or titania.

* * * * *